US007676000B2

(12) United States Patent
Garg et al.

(10) Patent No.: US 7,676,000 B2
(45) Date of Patent: Mar. 9, 2010

(54) SYSTEMS AND METHODS FOR AN ADAPTIVE RAKE RECEIVER

(75) Inventors: Rahul Garg, Faridabad (IN); Shobha Ramaswamy, Bangalore (IN); Kiran Devanahalli, Bangalore (IN); Satyanarayana Sanpini, Dowlaiswaram (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 1820 days.

(21) Appl. No.: 10/758,054

(22) Filed: Jan. 15, 2004

(65) Prior Publication Data

US 2005/0159120 A1    Jul. 21, 2005

(51) Int. Cl.
 *H04L 27/06* (2006.01)
(52) U.S. Cl. .................. 375/340; 375/147; 375/148; 375/316; 455/132

(58) Field of Classification Search ................. 375/148, 375/347, 349; 455/132, 296
See application file for complete search history.

(56) References Cited

U.S. PATENT DOCUMENTS

| 5,544,156 A * | 8/1996 | Teder et al. ............. 370/342 |
| 5,572,552 A * | 11/1996 | Dent et al. ............. 375/343 |
| 2005/0130616 A1 * | 6/2005 | Khayrallah et al. ...... 455/242.2 |
| 2005/0152486 A1 * | 7/2005 | Wang ..................... 375/350 |

* cited by examiner

*Primary Examiner*—David C Payne
*Assistant Examiner*—Leon Flores
(74) *Attorney, Agent, or Firm*—Prakash Nama; Global IP Services, PLLC

(57) ABSTRACT

A technique for signal distortion compensation using a filter that can support a higher delay spread distortion without substantially increasing hardware complexity. In one example embodiment, an adaptive receiver design compensates for signal distortions with the use of non-uniform tap delay filters. The non-uniform tap delay filters are used to output an adaptively channel matched signal for decoding.

13 Claims, 6 Drawing Sheets

SYSTEMS AND METHODS FOR AN ADAPTIVE RAKE RECEIVER

TECHNICAL FIELD OF THE INVENTION

The present invention relates generally to a communication receiver and more particularly to an adaptive Rake receiver.

BACKGROUND OF THE INVENTION

IEEE 802.11b is a popular standard for the implementation of high data rate Wireless LAN (Local Area Network) systems. The standard uses modulation techniques based on a spread spectrum. Complementary Code Keying (CCK) code words are used in these systems to obtain high data rates of 5.5 and 11 Mbps. These code words possess good auto correlation properties, which make them very attractive for wireless transmission. Performance of such code words degrades in the presence of multipath conditions that are inherent to indoor wireless application.

To operate in such multipath conditions, Rake receivers are used. A rake receiver is a class of receiver that receives signals on as many multipaths as possible. The Rake receiver combines the signals from all of these paths to produce one clear signal that is stronger than the individual components. The Rake receiver design is generally simplified by linear transformation of a Rake combiner resulting in a channel-matched filter. The coefficients of a channel-matched filter can be obtained using the channel coefficients estimated at a receiver. Delay spread of a multipath channel is obtained by using the channel coefficients. The delay spread of the multipath channel is used to benchmark such receivers. The performance of such receivers is dependent on channel characteristics.

The complexity of signal processing required at the receiver to compensate for a multipath channel is dependent on channel characteristics. A higher complexity receiver may be required to compensate for a higher delay spread in a multipath channel. Therefore, design tradeoff between hardware complexity and performance in the channels is generally required when implementing such receivers, i.e., the complexity of Rake receiver hardware increases as the delay spread increases in the channels to be compensated.

SUMMARY OF THE INVENTION

The present invention provides an adaptive Rake receiver design that can be used to compensate for signal distortions without substantially increasing hardware complexity. In one example embodiment, an adaptive receiver design compensates for signal distortions with the use of non-uniform tap delay filters. The non-uniform tap delay filters are used to output an adaptively channel matched signal for decoding.

DETAILED DESCRIPTION OF THE INVENTION

The present subject matter provides a novel low-complexity Rake receiver design that can support a higher delay spread in a channel without increasing hardware complexity. In one example embodiment, non-uniform tap delay filters are used in place of conventional uniform tap delay filters in a Rake receiver to reduce hardware complexity.

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The terms "tap delay filter" and "Rake filter" are used interchangeably throughout the document. Also, the terms "TF" and "tap filter" are used interchangeably throughout the document. In addition, the terms "TDF" and "tap delay filter" are used interchangeably throughout the document.

Figure 1:
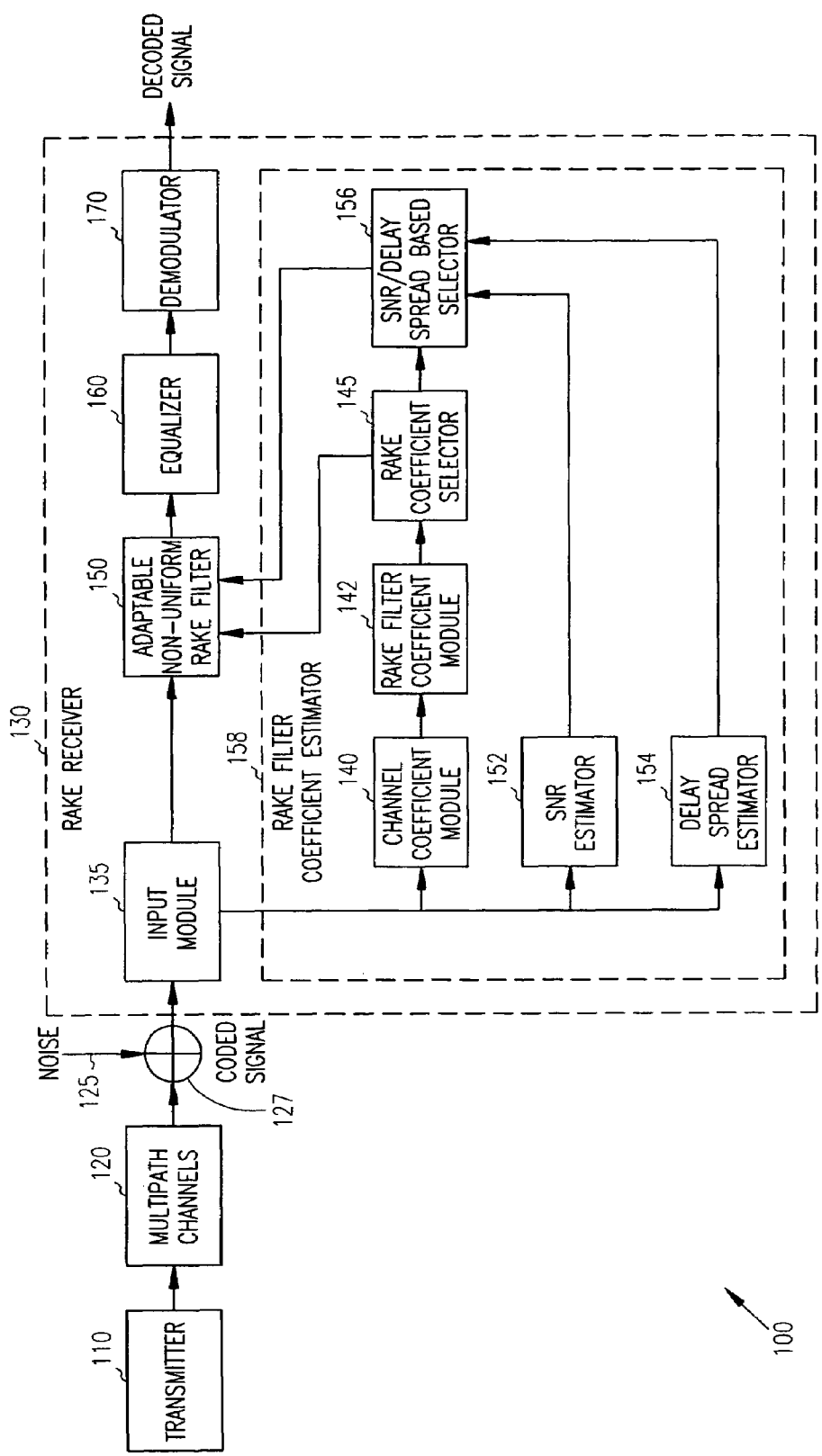
FIG. 1 is a block diagram illustrating an example Rake receiver using adaptable non-uniform tap-delay filters for implementing embodiments of the present invention.

FIG. 1 is a block diagram illustrating a communication system 100 including an example Rake receiver 130 using adaptable non-uniform tap-delay filters according to the present subject matter. The communication system 100 shown in FIG. 1 illustrates a transmitter 110, multipath channels 120, incoming noise 125, and the Rake receiver 130 coupled to the multipath channels 120 via an adder 127.

The Rake receiver 130 includes an input module 135, an adaptable non-uniform Rake filter 150, a Rake filter coefficient estimator 158, an equalizer 160, and a demodulator 170. The Rake filter coefficient estimator 158 includes a channel coefficient module 140, a Rake filter coefficient module 142, a Rake coefficient selector 145, an SNR estimator 152, and a delay spread estimator 154. In addition, the Rake filter coefficient estimator 158 further includes an SNR/Delay spread based selector 156. The adaptable non-uniform Rake filter 150 is coupled to the Rake coefficient selector 145 and the SNR/Delay spread based selector 156.

In operation, in one example embodiment, the input module 135 receives one or more channel components of the transmitted signal from the transmitter 110 via the multipath channels 120. In addition, the input module 135 also receives noise along with the one or more channel components as shown in FIG. 1. In some embodiments, each path of the channel is simulated using Rayleigh fading. Performance of the receiver is measured in terms of a RMS delay spread at which a packet error rate of 10% can be obtained for a packet size of 1024 octets.

The channel coefficient module 140 coupled to the input module 135 receives the one or more channel components from the input module 135 and estimates associated channel coefficients. In some embodiments, the channel coefficient module 140 estimates the channel coefficients using Weiner estimation principles.

The Rake filter coefficient module 142 computes a Rake filter coefficient for each computed channel coefficient. The Rake filter in a conventional communication system is designed as a uniform tap delay filter (TDF). In some embodiments, the coefficients for Rake are obtained from the estimated channel coefficients using the relation, $$R(kTs)=h^*(-kTs)$$

wherein R(kTs) represents Rake filter coefficients at time instants kTs, wherein k is a time index, Ts is a rate of operation of the Rake filter, and h(kTs) represents the estimated channel coefficients. The conjugate and time reversal of the channel coefficients h(kTs) are performed to obtain the h*(−kTs).

The Rake coefficient selector 145 coupled to the Rake filter coefficient module 142 receives the computed Rake filter coefficients from the Rake filter coefficient module 142. Rake coefficient selector 145 then selects one or more Rake filter coefficients from the received Rake filter coefficients based on channel characteristics so that the number of required multipliers is minimized to obtain a higher delay spread coverage without increasing the hardware complexity of the Rake receiver 130.

In some embodiments, the number of Rake filter coefficients required is reduced so that required number of multipliers is reduced. In one embodiment, Rake coefficient selector 145 selects the one or more Rake filter coefficients based on channel components having the most signal energy. In some of these embodiments, the Rake coefficient selector 145 selects a channel component having the most signal energy as the primary channel component from the one or more Rake filter coefficients. The Rake coefficient selector 145 then applies weighted criteria to each Rake filter coefficient corresponding to precursor and post cursor components (i.e., channel components that fall before and after, respectively, the primary channel component). In these embodiments, the Rake coefficient selector 145 applies the weighted criteria based on knowledge of a specific scenario and/or an application of a Rake receiver usage. The Rake receiver applications can include specific scenarios, such as an indoor wireless application, an outdoor wireless application, a line-of-sight application, and so on. In these embodiments, the equalizer 160 is used to reduce signal energy in the precursor or the post-cursor channel components based on the application. Knowing the type of equalizer, the Rake compensation can be done differently for the pre and post cursor components (i.e., channel components are weighted based on the type of equalizer).

In another embodiment, the Rake filter coefficient estimator 158 selects the one or more Rake filter coefficients using a noise based elimination of the Rake filter coefficients. In these embodiments, the SNR (signal-to-noise ratio) estimator 152 estimates SNR of incoming signal. In addition, the SNR estimator 152 determines a predetermined SNR. The predetermined SNR refers to a first threshold SNR value corresponding to the estimated SNR. Secondary components of the estimated Rake coefficients, which are below the first threshold SNR value relative to primary components, are to be weighted. The determined first threshold SNR value can be SNR dependent.

The SNR/Delay spread based selector 156 then compares each of the selected one or more Rake filter coefficients to the first threshold SNR value with respect to the primary channel component. The SNR/Delay spread based selector 156 then selects a subset of Rake filter coefficients from the selected one or more Rake filter coefficients such that each of the selected one or more Rake filter coefficients in the subset have a signal energy higher than or equal to the first threshold SNR value with respect to the channel component having the most signal energy. Rake filter coefficients having a signal energy lower than the first threshold SNR value is not included in the subset of Rake filter coefficients because they can contribute to degradation of the adaptively channel matched signal.

In yet another embodiment, the Rake filter coefficient estimator 158 further selects the Rake filter coefficients from the selected subset and switches to a default Rake filter based on SNR estimate obtained in the SNR estimator 152. The SNR/Delay spread based selector 156 then compares the determined SNR to a second threshold SNR value. If the estimated SNR is below the second threshold SNR value then the SNR/Delay spread based selector 156 configures the structure using default filter coefficients. In some embodiments, the default filter coefficients may compensate for known transmit and receive filter characteristics.

In yet another embodiment, the Rake filter coefficient estimator 158 further selects the Rake filter coefficients from the selected subset and switches to a default Rake filter based on a delay spread estimate. In these embodiments, the delay spread estimator 154 determines the channel spread using the channel coefficients. The SNR/Delay spread based selector 156 then compares the determined channel spread to a threshold spread value. If the channel spread is below the threshold spread value then the SNR/Delay spread based selector 156 configures the structure using default filter coefficients. In some embodiments, the default filter coefficients may compensate for known transmit and receive filter characteristics.

An adaptable non-uniform Rake filter 150 coupled to the Rake coefficient selector 145 and the SNR/Delay spread based selector 156 extracts delay information from each of the selected Rake filter coefficients on a real-time basis. The Rake coefficient selector 145 then configures structure of multiple non-uniform tap delay filters in the adaptable non-uniform Rake filter 150 as a function of gate count and filter properties. In some embodiments, the adaptable non-uniform Rake filter 150 configures register structure of the non-uniform tap delay filters. In other embodiments, the adaptable non-uniform Rake filter 150 configures structure of the multiplier bank in the non-uniform tap delay filters.

Figure 2:
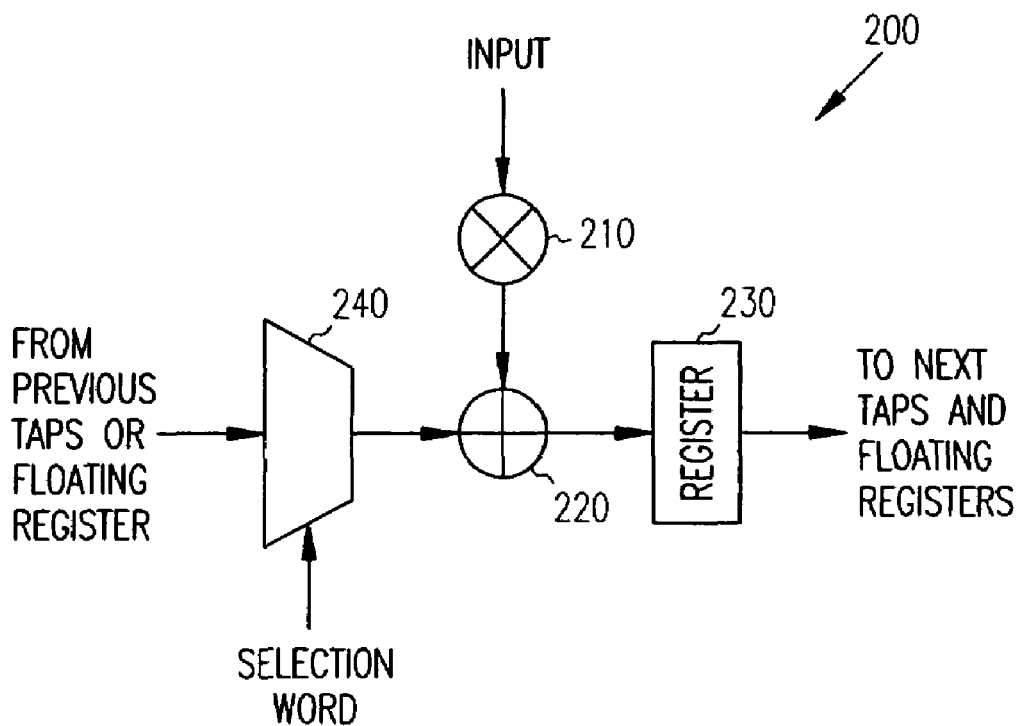
FIGS. 2 and 3 are block diagrams illustrating configurable register structure for the non-uniform tap-delay filters.
Figure 3:
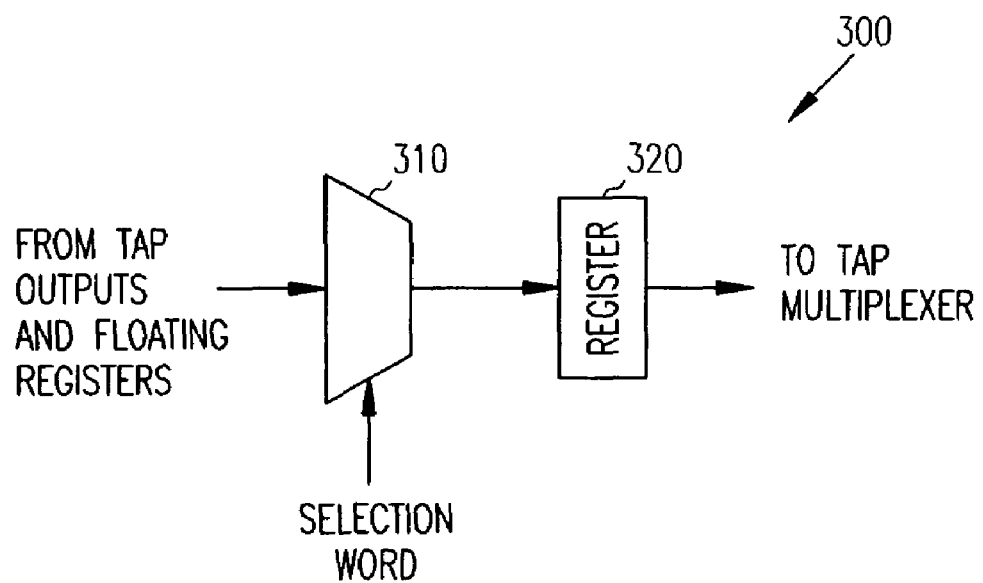

FIGS. 2 and 3 together illustrate block diagrams 200 and 300, respectively, of a configurable register structure that is a modified form of a tap filter. FIG. 2 illustrates a block diagram 200 of a basic-taps and FIG. 3 illustrates a block diagram of floating registers. The basic-tap shown in FIG. 2 includes a multiplier 210, an adder 220, a register 230, and a multiplexer 240. The floating register shown in FIG. 3 includes a multiplexer 310 and a register 320. A non-uniform TDF with configuration of (N, P−1, M) where N represents a maximum spread of a channel whose energy can be captured, P denotes a maximum group delay of the configurable filter structure, and M represents number of non-zero coefficients to be used in the Rake. N and P are defined with respect to a rate of operation of the Rake filter. The basic-taps and floating registers shown in FIGS. 2 and 3, respectively, can be configurably cascaded and inserted between taps, wherever zero-coefficients are present, by appropriately configuring the multiplexer selection words. The estimator indicates through the serial interface the location of zero taps, which is used to configure the floating registers. Generally, the basic-tap multiplexer size is fixed at (N−M+1):1. In the example configurable register structure shown in FIGS. 2 and 3, the filtering operation cannot be maintained because the filter registers are reorganized. This can require a disruption in the output from the configurable register structure for M cycles. The critical path for timing in this structure is same as a conventional tap filter.

Figure 4:
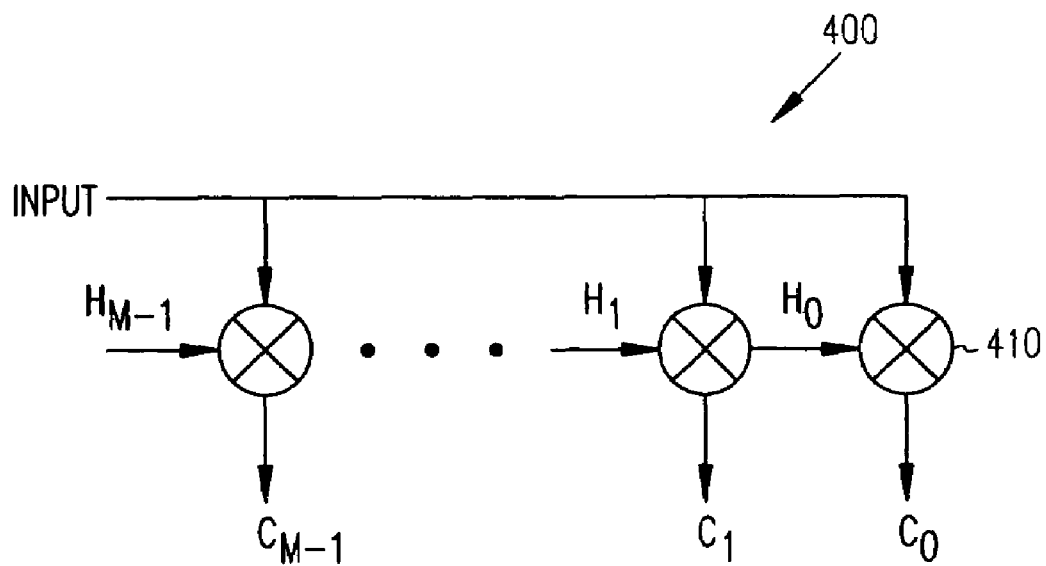
FIGS. 4 and 5 are block diagrams illustrating configurable multiplier structure for the non-uniform tap-delay filters.
Figure 5:
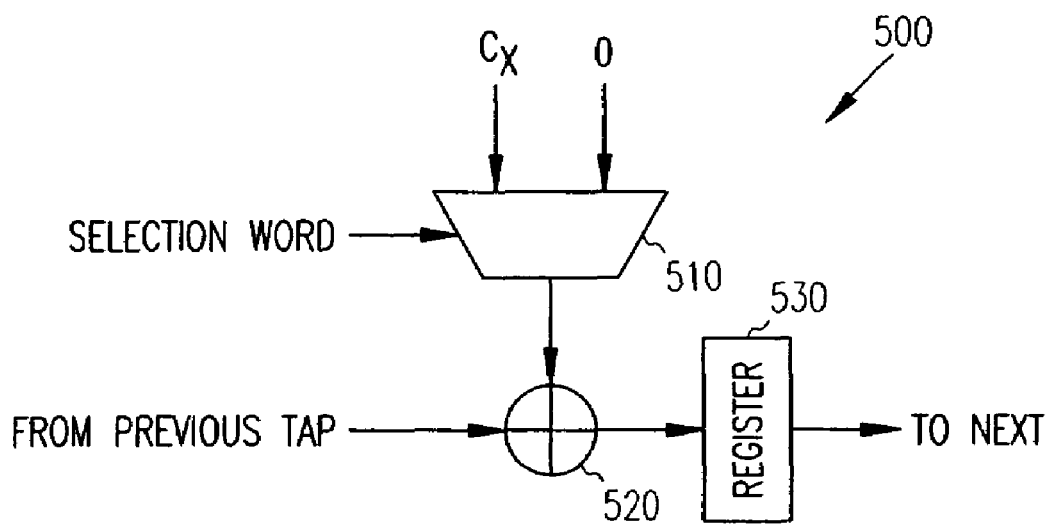

FIGS. 4 and 5 together illustrate block diagrams 400 and 500, respectively of a configurable multiplier structure that is also a modified form of a tap filter. FIG. 4 illustrates a multiplier bank ($h_0$-$h_{M-1}$) 410. FIG. 5 illustrates a basic-tap. The multipliers in FIG. 4 are shown separated from the basic-tap shown in FIG. 5 to form the multiplier bank 410, whose output can be configured to connect to different basic-taps based on the estimated coefficients. The basic-tap shown in FIG. 5 includes a multiplexer 510, an adder 520, and a register 530.

The multiplexers 510 are configured based on location of the selected Rake filter coefficients to connect the multiplier outputs to basic-taps for filtering. If the Rake filter coefficient is zero then the multiplexer feeds a zero to the basic-tap. To reduce the multiplexer size the number of multipliers that can feed to a basic-tap can be constrained. For example, size of a multiplexer can increase from 2:1 to M:1 and again decrease to 2:1. The Rake filter coefficients can be loaded serially when the filtering process is proceeding in a normal manner. After all the basic-taps are loaded, the Rake-filtered sample comes out. Hence demodulation can be performed even when loading a Rake filter coefficient. The critical path for timing consists of a multiplier, the largest multiplexer (M:1), and an adder. This can lead to a longer critical path than a configurable register structure. An average multiplexer size is smaller in a configurable multiplier structure (generally includes more adders) the gate counts are almost the same as shown in the following example table, which illustrates gate count comparison between the register movement structure and the multiplier movement structure.

| Taps (N, P-1, M) | Configurable Register Structure | Configurable Multiplier Movement |
|---|---|---|
| (9, 5) | 19.6K | 19.1K |
| (11, 5) | 20.72K | 20.65K |

The input module 135 then inputs each of the received one or more channel components through the configured non-uniform tap delay filters which outputs an adaptively channel matched signal. The equalizer 160 and the demodulator 170 receive the adaptively channel matched signal and output a decoded signal.

Figure 6:
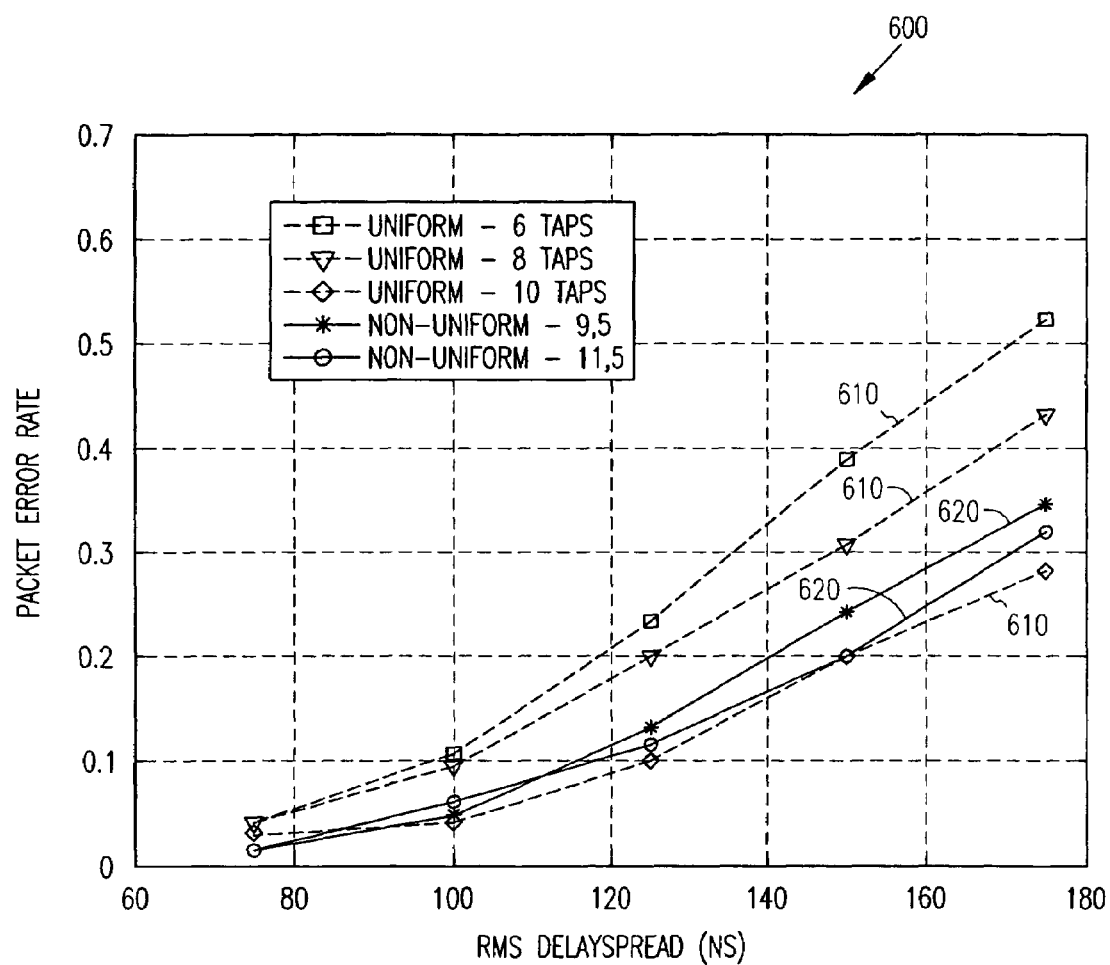
FIG. 6 is a graph illustrating performance comparison of a Rake receiver using adaptable non-uniform tap delay filters and conventional uniform tap delay filters.

Referring now to FIG. 6, there is illustrated a graph 600 of performance of the adaptable Rake filter 620 versus performance of a conventional uniform tap filter 610. The graph 600 illustrates performance of the Rake filter 620 obtained at 20 db operating under a channel profile defined by the IEEE committee at 22 MHz. in this example embodiment, the non-uniform filter configuration is specified using a maximum spread of a channel that can be captured (N) and a maximum possible group delay of the filter (P) defined with respect to the operation of the rate of a filter. Also in this example embodiment, the number of multipliers used for the non-uniform Rake filter is fixed at 6. It can be seen in FIG. 6 that the performance of Rake receiver when using the adaptable non-uniform Rake filter 620 including 5 configurable multipliers is better than the performance of a Rake receiver when using a convention uniform tap filter 610 including multipliers of 6, 8, and 10.

The following table further illustrates the error count compensation achieved in a Rake receiver when using an adaptable non-uniform tap delay filter. The following error count compensation has been performed using a fixed value of 6 for M.

| Non-Uniform TDF Configuration (N, P-1) | Performance Equivalent Uniform TDF (Taps) | Non-Uniform TDF | | |
|---|---|---|---|---|
| | | Filter (K gates) | Coeff. Selection Logic | Total |
| 9, 5 | 24.95K (9) | 19.10 | 0.34K | 19.44K |
| 11, 5 | 27.67K (10) | 20.65 | 0.35K | 21.00K |

It can be seen from the above table that the gate count achieved is very similar when the TDF configuration is (9,5) and (11,5). It clearly shows that with a fixed number of 5 multipliers and a varying number of Rake channel components, the performance achieved when using the adaptable non-uniform tap delay filter is very similar and thus reducing the hardware complexity of the Rake receiver.

Figure 7:
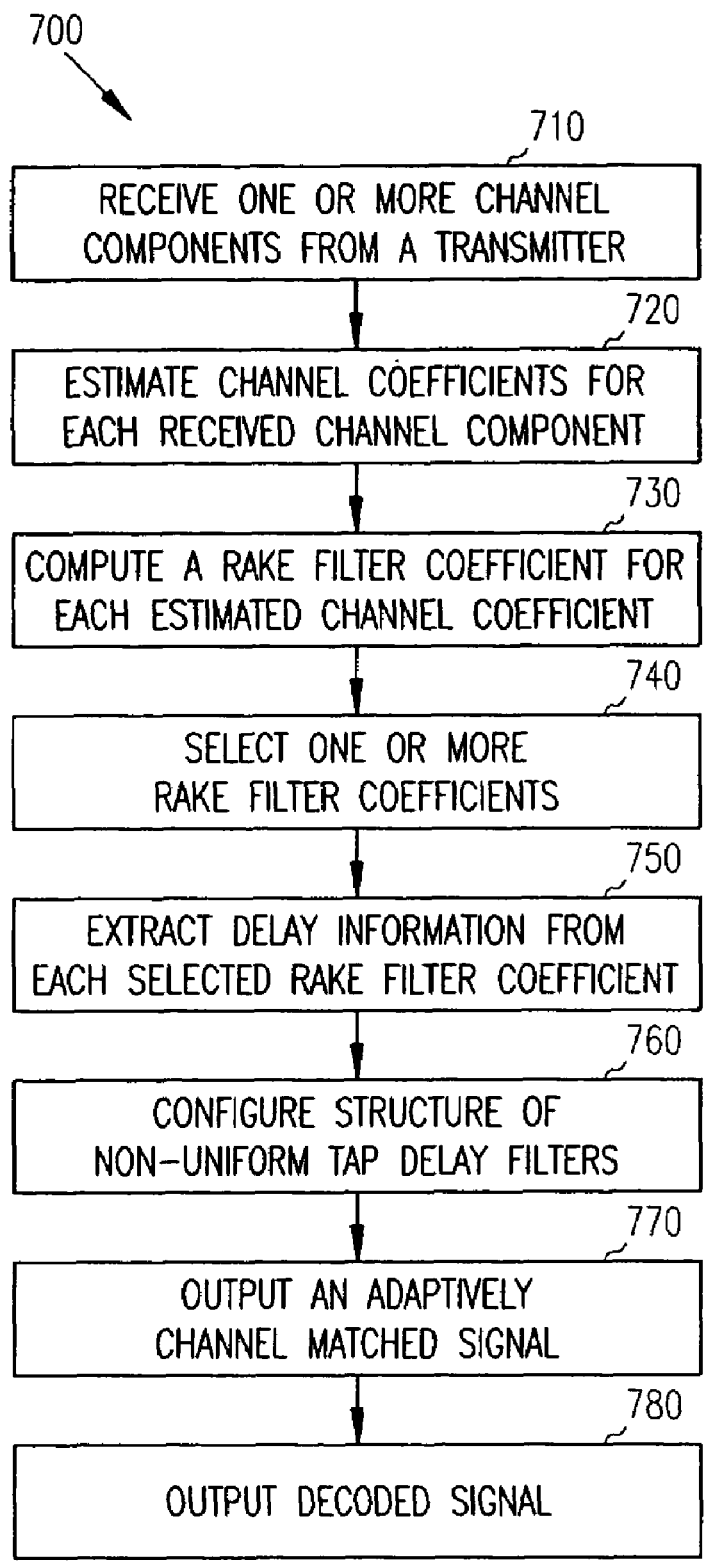
FIG. 7 is a flowchart illustrating an adaptive Rake receiver technique.

FIG. 7 is a flowchart illustrating an example embodiment of a method 700 of an adaptive Rake receiver technique according to the present subject matter. At 710, the method 700 in this example embodiment receives one or more channel components from a transmitter.

At 720, channel coefficients of each received channel component are estimated. At 730, a Rake filter coefficient is computed for each estimated channel coefficient, At 740, one or more Rake filter coefficients are selected from the estimated channel coefficient based on channel characteristics. At 750, delay information from each selected Rake filter coefficient is extracted.

At 760, structure of non-uniform tap delay filters are configured based on the delay information. In some embodiments, the non-uniform delay filters are configured by first estimating SNR (signal-to-noise ratio). A first threshold SNR value is then determined using the estimated SNR. Each of the selected one or more Rake filter coefficients are then compared to the first threshold SNR value with respect to the channel component having the most signal energy. A subset of the selected one or more Rake filter coefficients is then selected such that each of the subset of the one or more Rake filter coefficients in the subset have a signal energy higher than or equal to the first threshold SNR value with respect to the channel component having the most signal energy.

In other embodiments, the non-uniform delay filters are configured by first determining a channel spread using the selected subset of Rake filter coefficients. The determined channel spread is then compared to a threshold spread value. A default non-uniform tap delay filter structure is used when the determined channel spread is below the threshold spread value.

At 770, an adaptive channel matched signal is outputted using the configured non-uniform tap delay filters. At 780, the adaptively channel matched signal is demodulated to output a decoded signal. Each of the above acts is explained in more detail with reference to FIGS. 1-6.

Although the method 700 includes acts 710-780 that are arranged serially in the exemplary embodiments, other embodiments of the present subject matter may execute two or more acts in parallel, using multiple processors or a single processor organized two or more virtual machines or subprocessors. Moreover, still other embodiments may implement the acts as two or more specific interconnected hardware modules with related control and data signals communicated between and through the modules, or as portions of an application-specific integrated circuit. Thus, the exemplary process flow diagrams are applicable to software, firmware, and/or hardware implementations.

Various embodiments of the present invention can be implemented in software, which may be run in the environment shown in FIG. 8 (to be described below) or in any other suitable computing environment. The embodiments of the present invention are operable in a number of general-purpose or special-purpose computing environments. Some computing environments include personal computers, general-purpose computers, server computers, hand-held devices (including, but not limited to, telephones and personal digital assistants of all types), laptop devices, multi-processors, microprocessors, set-top boxes, programmable consumer electronics, network computers, minicomputers, mainframe computers, distributed computing environments and the like to execute code stored on a computer-readable medium. The embodiments of the present invention may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Figure 8:
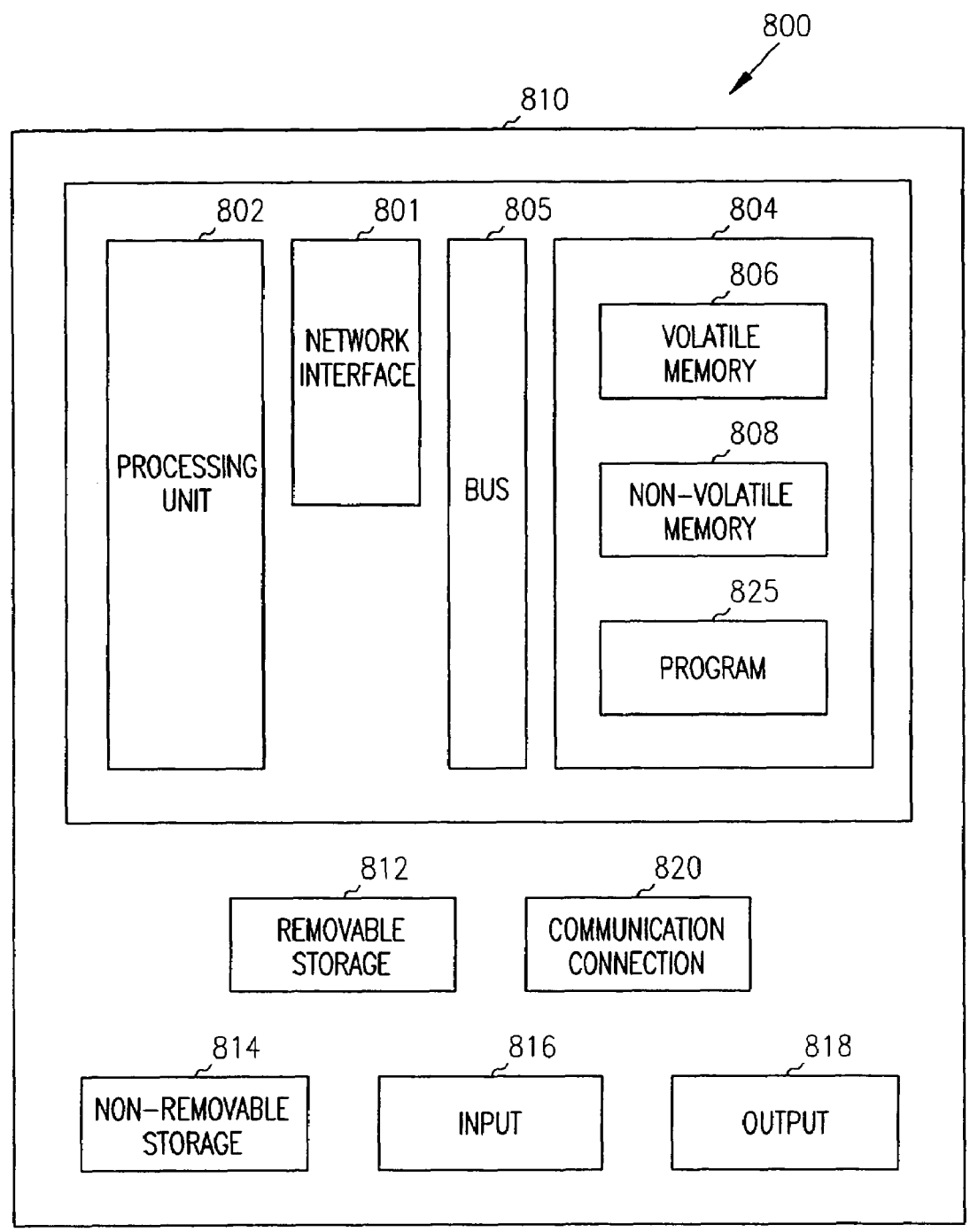
FIG. 8 is an example of a suitable computing environment for implementing embodiments of the present invention.

FIG. 8 shows an example of a suitable computing system environment for implementing embodiments of the present invention. FIG. 8 and the following discussion are intended to provide a brief, general description of a suitable computing environment in which certain embodiments of the inventive concepts contained herein may be implemented.

A general computing device, in the form of a computer 810, may include a processing unit 802, memory 804, removable storage 812, and non-removable storage 814. Computer 810 additionally includes a bus 805 and a network interface (NI) 801.

Computer 810 may include or have access to a computing environment that includes one or more input elements 816, one or more output elements 818, and one or more communication connections 820 such as a network interface card or a USB connection. The computer 810 may operate in a networked environment using the communication connection 820 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 804 may include volatile memory 806 and non-volatile memory 808. A variety of computer-readable media may be stored in and accessed from the memory elements of computer 810, such as volatile memory 806 and non-volatile memory 808, removable storage 812 and non-removable storage 814. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present invention may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 802 of the computer 810. For example, a computer program 825 may comprise machine-readable instructions capable of shaping quantization noise in each band by setting a scale factor in each band based on its psychoacoustic parameters and energy ratio according to the teachings and herein described embodiments of the present invention. In one embodiment, the computer program 825 may be included on a CD-ROM and loaded from the CD-ROM to a hard drive in non-volatile memory 808. The machine-readable instructions cause the computer 810 to encode an audio signal on a band-by-band basis by shaping quantization noise in each band using its local gain according to some embodiments of the present invention.

The above description is intended to be illustrative, and not restrictive. Many other embodiments will be apparent to those skilled in the art. The scope of the invention should therefore be determined by the appended claims, along with the full scope of equivalents to which such claims are entitled.

The invention claimed is:

1. A Rake receiver for receiving one or more channel components from a transmitter and outputting a channel matched signal comprising:
    a channel coefficient module that estimates channel coefficients of each received channel component from the transmitter;
    a Rake filter coefficient module that computes a Rake filter coefficient for each estimated channel coefficient;
    a Rake coefficient selector that selects one or more Rake filter coefficients from the computed Rake filter coefficients based on channel characteristics;
    an adaptable non-uniform Rake filter that extracts delay information from each selected Rake filter coefficient on a real time basis and configures structure of non-uniform tap delay filters, and wherein the adaptable non-uniform Rake filter combines the one or more channel components with associated delay information using the configured adaptable non-uniform Rake filter and outputs the adaptively channel matched signal;
    an SNR estimator that estimates SNR (signal-to-noise ratio); and
    an SNR/Delay spread based selector that compares each of the selected one or more Rake filter coefficients to a first threshold SNR value with respect to the channel component having the most signal energy, wherein the adaptable non-uniform Rake filter selects a subset of Rake filter coefficients from the selected one or more Rake filter coefficients such that each of the one or more Rake filter coefficients in the subset have a signal energy higher than or equal to the first threshold SNR value with respect to the channel component having the most signal energy.

2. The Rake receiver of claim 1, wherein the adaptable non-uniform Rake filter configures register structures of the non-uniform tap delay filters.

3. The Rake receiver of claim 1, wherein the adaptable non-uniform Rake filter configures structure of multiplier bank of the non-uniform tap delay filters.

4. A Rake receiver for receiving one or more channel components from a transmitter and outputting a channel matched signal comprising:
   a channel coefficient module that estimates channel coefficients of each received channel component from the transmitter;
   a Rake filter coefficient module that computes a Rake filter coefficient for each estimated channel coefficient;
   a Rake coefficient selector that selects one or more Rake filter coefficients from the computed Rake filter based on channel characteristics;
   an adaptable non-uniform Rake filter that extracts delay information from each selected Rake filter coefficient on a real time basis and configures structure of non-uniform tap delay filters, and wherein the adaptable non-uniform Rake filter combines the one or more channel components with associated delay information using the configured adaptable non-uniform Rake filter and outputs the adaptively channel matched signal;
   an SNR estimator that estimates SNR (signal-to-noise ratio);
   an SNR/Delay spread based selector that compares each of the selected one or more Rake filter coefficients to a first threshold SNR value with respect to the channel component having the most signal energy, wherein the adaptable non-uniform Rake filter selects a subset of Rake filter coefficients from the selected one or more Rake filter coefficients such that each of the one or more Rake filter coefficients in the subset have a signal energy higher than or equal to the first threshold SNR value with respect to the channel component having the most signal energy; and
   a delay spread estimator to determine a channel spread using the input signal, wherein the SNR/Delay spread based selector compares the determined channel spread to a threshold spread value, wherein the adaptable non-uniform Rake filter does switches to a default Rake filter when the determined channel spread is below the threshold spread value.

5. The Rake receiver of claim 4, wherein the Rake coefficient selector further selects default Rake filter coefficients from the selected subset of Rake filter coefficients and switches to a default Rake filter based on estimated SNR obtained from the SNR estimator, wherein the SNR/Delay spread based selector compares the estimated SNR to a second threshold SNR value and configures the adaptable non-uniform Rake filter structure using the default Rake filter coefficients when the estimated SNR is below the second threshold SNR value.

6. A system comprising:
   a bus;
   a processor coupled to the bus;
   a memory coupled to the processor;
   a network interface coupled to the processor and the memory;
   a Rake receiver coupled to the network interface and the processor, wherein the Rake receiver further comprising:
      a channel coefficient module to estimate channel coefficients of each received channel component from a transmitter;
      a Rake filter coefficient module to compute a Rake filter coefficient for each estimated channel coefficient;
      a Rake coefficient selector to select one or more Rake filter coefficients from the computed Rake filter coefficients based on channel characteristics; and
      an adaptable non-uniform Rake filter to extract delay information from each selected Rake filter coefficient and to configure structure of non-uniform tap delay filters, and wherein the adaptable non-uniform Rake filter to combine the one or more channel components with associated delay information using the configured adaptable non-uniform Rake filter and to output the channel matched signal;
   an SNR estimator to estimate a threshold SNR (signal-to-noise ratio) value; and
   an SNR/Delay spread based selector to compare each of the selected one or more Rake filter coefficients to the first threshold SNR value with respect to the channel component having the most signal energy, wherein the adaptable non-uniform Rake filter selects a subset of the one or more Rake filter coefficients such that each of the one or more Rake filter coefficients in the subset have a signal energy higher than or equal to the first threshold SNR value with respect to the channel component having the most signal energy.

7. The system of claim 6, further comprising: a demodulator to receive the channel matched signal and to output a decoded signal.

8. A system comprising:
   a bus;
   a processor coupled to the bus;
   a memory coupled to the processor;
   a network interface coupled to the processor and the memory; and
   a Rake receiver coupled to the network interface and the processor, wherein the Rake receiver further comprising:
      a channel coefficient module estimates channel coefficients of each received channel component from a transmitter;
      a Rake filter coefficient module computes a Rake filter coefficient for each estimated channel coefficient;
      a Rake coefficient selector selects one or more Rake filter coefficients from the estimated channel coefficients based on channel characteristics;
   an adaptable non-uniform Rake filter extracts delay information from each selected Rake filter coefficient and to configure structure of non-uniform tap delay filters, and wherein the adaptable non-uniform Rake filter to combine the one or more channel components with associated delay information using the configured adaptable non-uniform Rake filter and to output the channel matched signal; and
   a delay spread estimator to determine a channel spread using the channel coefficients, wherein the SNR/Delay spread based selector compares the determined channel spread to a threshold spread value, wherein the adaptable non-uniform Rake filter does not configure structure of the non-uniform tap delay filters when the determined channel spread is below the threshold spread value.

9. A method comprising:
   receiving one or more channel components from a transmitter;
   estimating channel coefficients of each received channel component from the transmitter;

computing a Rake filter coefficient for each estimated channel coefficient;
selecting one or more Rake filter coefficients from the estimated channel coefficients based on channel characteristics;
extracting delay information from each selected Rake filter coefficient;
configuring structure of non-uniform tap delay filters based on the delay information; and
outputting an adaptively channel matched signal using the configured structure of non-uniform tap delay filters, wherein configuring the structure of non-uniform tap delay filters based on the delay information comprises:
estimating a SNR;
determining a second threshold SNR value based on the estimated SNR;
comparing each of the selected one or more Rake filter coefficients to the second threshold SNR value with respect to the channel component having the most signal energy; and
selecting a subset of the one or more Rake filter coefficients such that each of the one or more Rake filter coefficients in the subset have a signal energy higher than or equal to the second threshold SNR value with respect to the channel component having a most signal energy.

10. The method of claim 9, wherein configuring the structure of non-uniform tap delay filters based on the delay information comprises:
determining a channel spread using the channel coefficients;
comparing the determined channel spread to a threshold spread value; and
switching to a default non-uniform tap delay filter structure when the determined channel spread is below the threshold spread value.

11. The method of claim 9, wherein selecting the one or more Rake filter coefficients comprises:
selecting a channel component having the most signal energy as a primary channel component from the one or more Rake filter coefficients;
applying a weighted criteria for Rake filter coefficients corresponding to channel components before and after the primary channel component; and
selecting the one or more Rake filter coefficients based on the applied weighted criteria.

12. An article comprising:
a storage medium having instructions that, when executed by a computing platform, result in execution of a method comprising:
receiving one or more channel components from a transmitter;
estimating channel coefficients of each received channel component from the transmitter;
computing a Rake filter coefficient for each estimated channel coefficient;
selecting one or more Rake filter coefficients from the estimated channel coefficients based on channel characteristics, wherein selecting the one or more Rake filter coefficients comprises:
selecting a channel component having the most signal energy as a primary channel component from the one or more Rake filter coefficients;
applying a weighted criteria for Rake filter coefficients corresponding to channel components before and after the primary channel component; and
selecting the one or more Rake filter coefficients based on the applied weighted criteria;
extracting delay information from each selected Rake filter coefficient;
configuring structure of non-uniform tap delay filters based on the delay information; and
outputting a channel matched signal using the configured structure on non-uniform tap delay filters,
wherein configuring the structure of non-uniform tap delay filters based on the delay information comprises:
estimating a SNR;
determining a second threshold SNR value based on the estimated SNR;
comparing each of the selected one or more Rake filter coefficients to the second threshold SNR value with respect to the channel component having the most signal energy; and
selecting a subset of the one or more Rake filter coefficients such that each of the subset of the selected one or more Rake filter coefficients have a signal energy higher than or equal to the second threshold SNR value with respect to the channel component having the most signal energy.

13. The article of claim 12, wherein configuring the structure of non-uniform tap delay filters based on the delay information comprises:
determining a channel spread using the selected subset of Rake filter coefficients;
comparing the determined channel spread to a threshold spread value; and
switching to a default non-uniform tap delay filter structure when the determined channel spread is below the threshold spread value.

* * * * *